Sept. 13, 1960

YOSHITADA MINAMI

2,952,764

METHOD AND APPARATUS FOR AUTOMATICALLY BOILING RICE

Filed May 29, 1957

Sept. 13, 1960 YOSHITADA MINAMI 2,952,764
METHOD AND APPARATUS FOR AUTOMATICALLY BOILING RICE
Filed May 29, 1957 5 Sheets-Sheet 3

United States Patent Office 2,952,764
Patented Sept. 13, 1960

2,952,764
METHOD AND APPARATUS FOR AUTOMATICALLY BOILING RICE

Yoshitada Minami, Tokyo-to, Japan, assignor, by mesne assignments, of one-half to Tokyo Shibaura Denki Kabushiki Kaisha (known as Tokyo Shibaura Electric Co., Ltd.), Kawasaki-Shi, Japan, a limited-liability company of Japan Filed May 29, 1957, Ser. No. 662,486

3 Claims. (Cl. 219—44)

This invention relates to an improved method and apparatus for automatically boiling rice, and more particularly relates to a method and apparatus for automatically boiling rice by utilizing electric heat.

The object of boiling rice is to obtain a boiled rice which is easy to digest and is of good taste. Such good rice is obtainable by converting to α state substantially all starch contained in the rice, and the starch begins to convert to α state at a temperature of about 60° C. to 70° C. or more when the rice is heated in a rice boiler together with substantially an equal quantity of water. The time required for converting substantially all the starch originally contained in rice to α state or alphanizing it is about from several hours to ten or more hours when heated at 60° C. to 70° C., but this time decreases to about twenty to forty minutes when heated at about 100° C., although exact time varies to some extent depending upon such factors as the type of rice, initial temperature of water in the boiler, ambient temperature and the like.

According to the conventional method for the boiling of rice, a rice-boiler containing substantially an equal quantity of rice and water is directly heated by town gas flame or by electric heat. By this method of boiling rice the temperature of the contents of the boiler rises rapidly so that it will reach 100° C. under atmospheric pressure in a relatively short time resulting in a boiling of the water in the boiler as well as rapid movement of rice particles which will cause friction between particles of rice. Therefore, the starch on the surfaces of the rice particles which has been partially converted to α state will drop off and will be mixed in water so as to form paste. The formed paste will result in a boiled rice of bad teste and a portion of the paste will gush out of the rice boiler and soil the floor or a heating apparatus supporting the rice boiler. Moreover, by the above-stated conventional method, usually it is not possible to convert to α state all of the starch, because the time of boiling is short. Therefore, it is customary to weaken the heating when boiling or ebullition of water begins to prevent severe boiling, thus maintaining the contents of the boiler at the alphanizing temperature or aging temperature over a relatively long period. Such operation not only needs considerable experience and skill, but also is liable to form burned crust around the inner surface of the boiler because of long heating time involved. It will also be clear that such method requires a large quantity of heat.

Accordingly, it is an object of this invention to provide a novel method of automatically boiling rice by electric heat, which method always yields, without any skill and experience, uniformly alphanized boiled rice of good taste.

Another object of this invention is to provide an improved rice boiling device in which the aging period required for alphanizing substantially all starch of rice can be set as desired.

Still another object of this invention is to provide an improved electric rice boiling device in which the rate of temperature rise at the initial stage of heating can be moderately alleviated, whereby severe ebullition and accompanying gush of paste are obviated.

A further object of this invention is to provide an improved electric rice boiling device in which the alphanizing period of rice is divided into a predetermined alphanizing period utilizing electric heat and an alphanizing period utilizing stored heat, whereby the heat can be economically utilized.

Briefly stated, according to this invention a rice boiler containing substantially an equal quantity of rice and water is disposed within a heating pot in such a manner as to partition a space between the inner wall of said heating pot and the outer wall of said boiler to receive a predetermined quantity of water depending on the quantity of water in the boiler. As will be more fully explained hereinafter, this water does an important function in determining the heating and alphanizing period, that is the heating and aging period. There is provided a lid common to said rice boiler and heating pot, said heating pot being heated by a suitable electric heating means.

Said heating pot is constructed so as to have a considerably large heat capacity or a suitable jacket is provided surrounding the whole or a portion of the outer surface of said pot to provide a thermally insulated space for heat storage. Thermally associated with said heating pot there is provided a temperature responsive switching device to deenergize said electric heating means in response to a predetermined temperature when the temperature of said pot rises quickly upon the completion of evaporation of water contained in the space between the rice boiler and the heating pot. In this way the whole period of time required for boiling rice is divided into the alphanizing or aging period of any desired length by electric heat and the alphanizing or aging period by the heat stored in the rice itself and the various constructional parts, making it possible to automatically boil rice in a very successful manner and without any skill.

For a more complete understanding of this invention reference may be had to the following detailed explanations in connection with the accompanying drawings in which.

Figure 1:
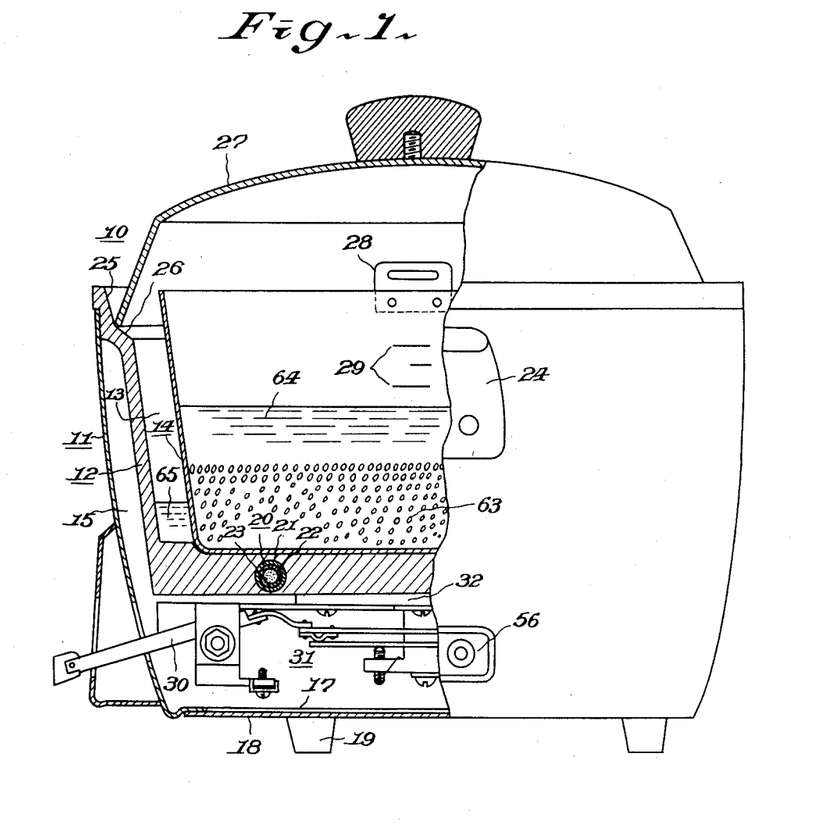
Fig. 1 shows an elevation, partly in section, of an apparatus embodying this invention.
Figure 2:
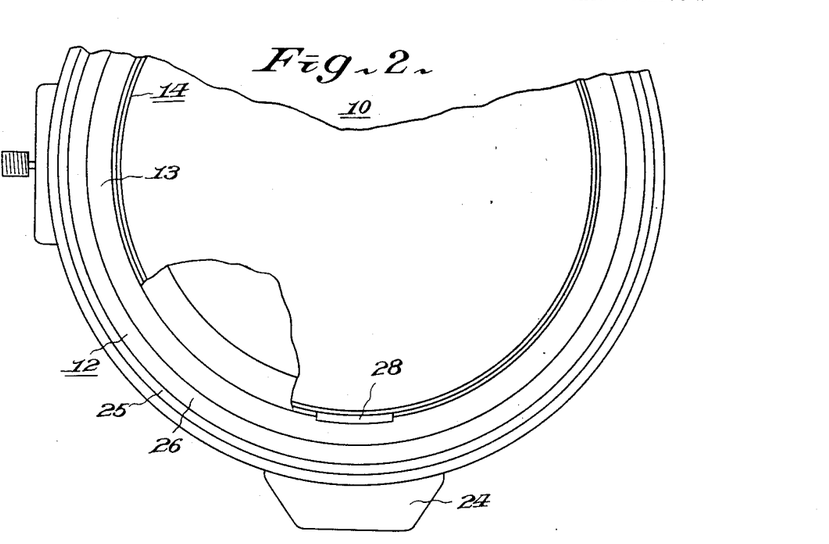
Fig. 2 shows a plan view, partly in section, of the apparatus of Fig. 1 with the lid removed.

Referring now to the accompanying drawings, especially to Figs. 1 and 2, the automatic rice boiling apparatus embodying this invention is generally shown by a numeral 10 and comprises a cup-like jacket 11, a heating pot 12 having its edge mounted upon and supported by the upper edge of the jacket and a rice boiler 14 disposed in said heating pot with a space 13 between the side walls of the pot and boiler. There is also formed a heat insulating chamber 15 between the jacket 11 and the heating pot 12. At the bottom of the jacket 11 there is provided an opening 17 for adjusting, through this opening, a temperature responsive device 31 mounted on the bottom of the heating pot in a manner as will be hereinafter described.

The opening 17 is closed by means of a bottom plate 18 after the adjustment of the temperature responsive device has been completed, and a plurality of legs 19 made of heat insulating material material are attached to said bottom plate, as shown in Fig. 1 the bottom of said heating pot is made thicker than its side wall so as to have an appreciable thermal capacity.

There is provided a suitable electric heater for heating this bottom. In Fig. 1, this heater is illustrated as a cast-in sheath wire type electric heater 20 which, as usual, comprises a steel sheath 21, a helical electric resistance wire 22 and a heat resistant and electric insulating material 23 compacted in the sheath. If the sheath 21 is made relatively thick, the heater itself would have a substantial heat capacity. The sheath wire type heater is shown as the general form of ring shape, but it may be formed in any other suitable shape such, for example, as wave shape and the like, and the heater may also be mounted on the bottom of the heating pot by any other suitable means such as welding.

As shown in Fig. 2, a pair of handles 24 (only one of them being shown in the drawing) made of heat insulating material are attached to the opposite sides of the jacket 11 for convenience of handling. The upper edges of the heating pot 12 and the jacket 11 are fixed together by any suitable means, for example, by spot welding so as to prevent the heating pot from disengaging from the jacket. At the inner side of the upper edge of the heating pot there is provided a relatively steep slope 25 and a relatively gentle slope 26 contiguous to the slope 25. A lid 27 whose inner periphery rides on said gentle slope 26 is provided to close both upper openings of the inner pot 14 and the heating pot 12. Thus, the tendency of water drops to escape out of the pot is effectively prevented by curved path comprised of steep and gentle slopes 25 and 26 formed at the upper edge of the heating pot. Moreover, by positioning the upper edge of the rice boiler 14 higher than the abutting line between the heating pot 12 and the lid 27, any liquid overflowing the upper edge of the inner pot 14 may be wholly received by the space 13 within the outer heating pot 12, so that it is possible to prevent the liquid from running over the upper edge of the heating pot. A pair of ears 28 is provided at the upper edge of the rice boiler to receive a hook (not shown in the drawing) when it is desired to take out the rice boiler when hot. On the inner wall of the rice boiler there are provided a number of water level indicating lines 29 as is well known in a metering cup.

For effecting manual energization of the electric heater mounted on the bottom of the pot 14 at the beginning of boiling rice and automatic deenergization thereof upon a predetermined rise of the temperature of the heating pot which occurs when the water in the heating pot is completely evaporated, in accordance with this invention there is provided within a heat insulating chamber 15 a temperature responsive device such as a thermal switch 31 provided with a manual operating handle 30 which extends through an opening in the wall of the jacket. This thermal switch may be disposed, a short distance spaced from the heating pot, in the bottom portion of the heat insulating chamber 15 which surrounds the bottom of the heating pot 12 so that it may be heated by a radiant heat from the bottom of the pot to respond to a predetermined temperature rise in the heating pot, but in such construction the thermal switch has a tendency not to respond accurately to the predetermined temperature rise in the heating pot owing to the effects of ambient temperature. Therefore, in accordance with the most preferred embodiment of this invention, the thermal switch 31 is directly mounted on the bottom of the heating pot 12 so as to have a heat conductive relation with said pot.

For facilitating the mounting of thermal switch 31, a heat conducting stud 32 is provided on the bottom of the heating pot 12 integral therewith and the thermal switch 31 is mounted on said stud directly and in heat conductive relation.

Figure 3:
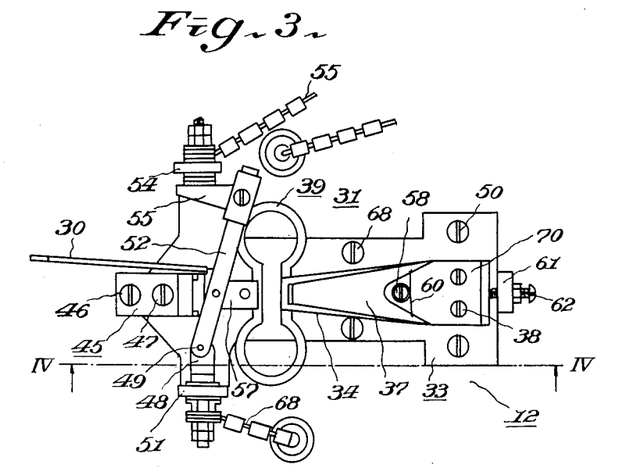
Fig. 3 is a plan view, as viewed from under of a temperature responsive switch mounted on the bottom of a heating pot of Fig. 1.
Figure 4:
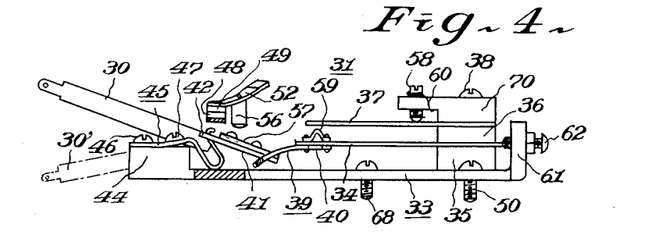
Fig. 4 is a side view of the switch shown in Fig. 3, cut along the line IV—IV and viewed in the direction of arrows.
Figure 5:
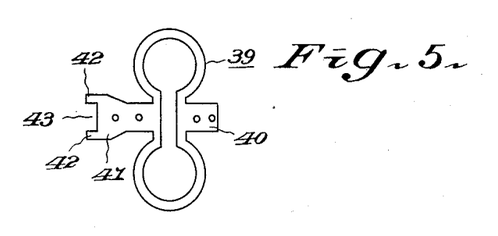
Fig. 5 is a plan view showing a circular spring used in the switch shown in Figs. 3 and 4.

A preferred form of the thermal switch 31 suitable for use in this embodiment is shown in Figs. 3 and 4. A base plate 33 on which are mounted various portions of the switch as hereinafter described is fixed to said heat conducting stud 32 by means of screws 50 and 68 and the like. One end of a bi-metallic element 34 is disposed on a block 35. A second block 36, a leaf spring 37 and a third block 70 are superposed each other on that end of the bi-metallic element and these elements are clamped to said base plate by a screw 38, said blocks 35, 36 and 70 being preferably made of metal. A spring plate 39 which has configuration of figure 8 as shown in Fig. 5 is mounted through its tongue 40 to the free end of said bi-metallic element, and one end of the switch operating handle 30 is attached to another tongue 41 provided at the central portion of said figure 8 shaped spring plate 39 at the side opposite to said tongue 40. A pair of ears 42 are formed by punching out one end of the tongue 41 to form a recess 43 between said ears. One leg of a generally V-shaped plate 45 made of resilient material is mounted on a pedestal 44 formed at the left hand end of the base plate 33 by means of a screw 46. As shown in Fig. 4, the curved end of the other leg of the spring plate 45 engages with said recess 43 formed between the ears 42 of a pair. Thus said plate 45 acts as a fulcrum for the tilting motion of the operating handle 30. In order to enable a slight adjustment of the height of the fulcrum, one leg of the plate 45 is curved slightly and the extent of this curve is made adjustable by an adjusting screw 47 which passes through the plate and is screwed in the pedestal 44.

Thus by tightening the screw 47, the fulcrum of the operating handle will be lowered and vice versa.

A pair of contacts 48 and 49 are provided as shown in Figs. 3 and 4 for controlling the energizing circuit of said sheath wire type heater. As will be clear from Fig. 3 the stationary contact 48 is supported through a suitable insulation on a bracket 51 which is integral with the base plate 33 and is connected with one terminal of said sheath wire type heater by way of a conductor 69. As shown in the drawing, the movable contact 49 is supported on one end of a conductive strip 52 made of resilient material, the other end of said strip being supported by an arm 53 which in turn is insulatedly supported by another bracket 54, thus maintaining the movable contact in a predetermined position. This movable contact is connected to one pole of a plug switch 56 shown in Fig. 1, while the other end of the sheath wire heater is connected to the other pole of said switch, thus connecting said pair of contacts to a source of electric supply in series with the heater. As shown in Fig. 4, the arm 52 supporting the movable contact 49 is slightly curved upwardly so that the movable contact 49 may engage with the stationary contact to make an electric circuit even when no external force is exerted on the arm 52. Fig. 4 shows an operated position in which the contacts are closed.

For moving the arm 52 in a direction to open the contacts, a cylindrical piece 56 made of electric insulating material is attached to the underside of the arm 52 in such a manner that its lower end lies over an operating member 57 provided on the right hand end of the handle 30. Counter clockwise movement of the handle around the pivot formed by curved end of said V-shaped plate 45 brings the operating member 57 to engage with the cylindrical piece 56, thus moving it upwardly. Thus the arm 52 is also pushed upwardly to separate the movable contact 49 from the stationary contact 48. The figure 8 shaped spring plate 39 not only acts as a spring for effecting snap action, but also acts as a biasing spring for locking the movable contact in the open and closed positions. For assuring the latter action, the figure 8 shaped spring plate is normally held in a slightly flexed state by some pressure imposed upon the central portion thereof from both sides. By this arrangement, it is possible to lock the handle 30 in the open position shown by full lines and in the closed position shown by dotted lines in Fig. 4.

The automatic operation of the switch from the closed position shown in Fig. 4 to the open position is as follows:

When the bi-metallic element 34 is subjected to a heating action exceeding a predetermined value, it flexes in a clockwise direction around its right hand fixed end. Due to this flexure, the free end of the element causes one end of the figure 8 shaped spring plate 39 to move upwardly and when this flexure exceeds a predetermined value the figure 8 shaped spring plate moves with snap action from the position shown in Fig. 4 to upwardly curved position for moving the handle 30 to the position shown by dotted lines to separate the contacts. For adjusting the temperature at which the contacts separate to a predetermined temperature, an adjusting screw 58 is provided, said screw 58 cooperating with the spring 37 for imparting an adjustable opposing force to the free end of the bi-metallic element. For this purpose a projection or a button 59 is provided at the free end of the bi-metallic element opposite to the free end of the spring plate 37. A coil spring 60 is wound around the adjusting screw 58 and the both ends of said spring are locked to the block 70 so as to prevent accidental movement of the screw after it has been set.

The upward and downward movements of the fulcrum formed by said V-shaped plate 45 also serve to the adjustment of said predetermined temperature at which the separation of the contacts occurs. Thus elevating of the fulcrum delays the occurrence of the snap action, thus causing the contacts to separate at a relatively higher predetermined temperature, while lowering of the fulcrum fastens the instant at which the snap action occurs, thus causing the contacts to separate at a relatively lower predetermined temperature. Further the adjustment of contact separation can also be effected by an adjusting screw 62 screwed in a projection 61 attached to the base plate 33, and connected to the bi-metallic element. By adjusting this screw, the bi-metallic element is adjusted in the longitudinal direction for increasing or decreasing the bending force impressed upon the figure 8 shaped spring plate 39. For enabling this adjustment, a suitable oblong slot (not shown) is provided at the fixed end of the bi-metallic element.

If the bi-metallic element is pushed to the left to increase bending force acting upon the figure 8 shaped spring plate 39, the temperature at which the separation of the contact occurs will be increased, while on the contrary, if the bi-metallic element is drawn to the right to decrease the bending force acting upon the bi-metallic element, the separation of the contacts would occur at a relatively low predetermined temperature.

Having completed the explanation relating to constructions and functions of various parts of the apparatus of this invention, the method of boiling rice of this invention will now be described.

Referring again to Fig. 1, the rice boiler 14 is first taken out and a quantity of suitably washed rice 63 and water 64 of substantially the same quantity as the rice are placed in it. Generally, the water quantity is dependent upon the quantity of rice, but it is most convenient to use the water level lines 29 which are calibrated by the quantity of rice to be charged in the boiler. Next a suitable quantity of water 65 is poured into the heating pot.

The quantity of this water varies in accordance with such factors as the quantity of water in the rice boiler, type of starch of rice and the like, but it is preferable to use this water in a quantity amounting to substantially 4 to 50% of the water quantity in the rice boiler. This water in the heating pot serves as an indirect heating medium for the contents in the rice boiler and also functions to establish a predetermined heating and aging period set in accordance with this invention. After inserting the rice boiler 14 containing rice and water into the heating pot 12, lid 27 is placed over these boiler and heating pots as shown in Fig. 1, and the operating handle 30 is moved to the contact closing position shown in Fig. 4.

Then the sheath wire type heater 20 is energized from a suitable source of electricity and begins to heat the heating pot. Initially the water 65 in the heating pot 12 is heated, which in turn heats up the contents in the rice boiler. Steam generated in the heating pot rises along the side wall of the rice boiler while heating it and then enters into the upper inside portion of the boiler around the upper edge thereof and heats the contents. As a result, the contents in the rice boiler are heated from all directions, resulting in a uniform heating. It should be emphasized that owing to the presence of water 65 in the heating pot, the rate of temperature rise of water in the rice boiler is naturally alleviated so that ebullition never occurs. Thus the rice particles in the boiler do not move violently as in the case of the conventional method of boiling rice, but stand still, so that there is no friction between the particles and the tendency of removal of surface starch to form paste is effectively precluded. This mode of heating is continued until the water 65 in the heating pot is completely evaporated.

Generally it takes about 20 to 40 minutes to complete the evaporation of water 65 in the heating pot, this time of course depending upon the quantity of water 65. While this water is evaporating and decreasing in quantity, the rate of temperature rise in the rice boiler will gradually increase. But, during this relatively long period of time the rice in the boiler is adequately heated and aged to alphanize a substantial quantity of starch contained in the rice.

Upon completion of evaporation of water in the heating pot 12, the factor that prevents the temperature rise beyond 100° C. in the pot is diminished resulting in a rapid temperature rise of said pot. Responsive to this rapid rise in temperature the thermal switch 31 associated with the heating pot operates at a predetermined temperature to separate the pair of contacts 48 and 49 to deenergize the heater circuit, as has been pointed out hereinbefore. Since the heating pot is constructed so as to have a relatively large heat capacity, it will absorb and store a substantial quantity of heat during rice boiling. If desired, a relatively massive steel plate or the like heat storage body not shown in the drawing may be attached to the bottom of the heating pot for increasing the heat storage capacity as will be more fully explained later. This is particularly desirable when the heating pot is made of aluminum or the like having relatively low specific heat. Furthermore, since there is provided a heat insulating space 15 between the heating pot and the outer jacket 11, heat loss from the heating pot is small. Thus the temperature of the boiled rice is maintained by the heat stored in the heating pot and the rice itself substantially at the temperature of the moment when the switch is opened, over a relatively long period of time after the thermal switch is operated. Accordingly, the contents in the rice boiler is maintained at the temperature necessary for alphanization over a suitable period of time after the deenergization of the heater, resulting in a complete alphanization of the rice. In the above, the initial half period of heating and alphanization can be controlled by the quantity of water 65 in the heating pot. That is, the more water 65 there is, the longer the time to open the thermal switch 31, and vice versa. It is to be understood that the quantity of water 65 to be poured into the heating pot is to be selected to the minimum quantity necessary to effect the desired alphanization of rice. This is necessary to minimize the electric power required for heating, thus providing most economic rice boiling. For example, for the ordinary non-glutinous rice it is sufficient to select the quantity of water 65 to an amount ranging from 4 to 50 percent based on the amount of water in the rice boiler, while for glutinous rice to about 30 to 50% of the quantity of water in the rice boiler.

Figure 6:
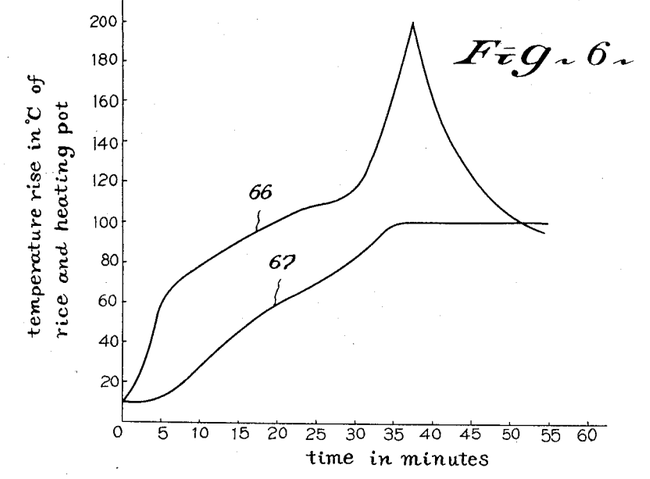
Figs. 6 and 7 show, respectively, a set of curves of rice boiling characteristics obtainable with the apparatus of this invention.
Figure 7:
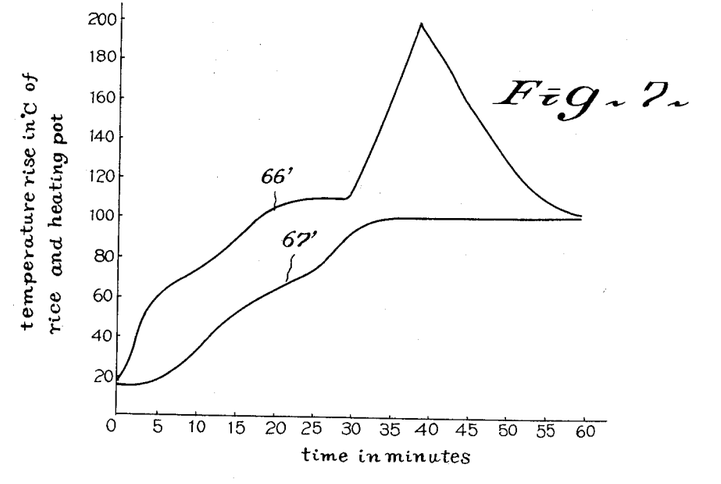

Figs. 6 and 7 show curves obtained by two different types of test of boiling rice utilizing the automatic rice boiling device of this invention. Fig. 6 shows two curves 66 and 67 showng the relation between the temperature rise in degrees centigrade of rice and heating pot and the time in minutes when 1 litre of water and 1 litre of rice is charged in the rice boiler and 0.1 litre of water is charged in the heating pot which corresponds to 10% of the water in the rice boiler and an electric heater of the rated capacity of 100 v., 620 w. is used. The curve 66 shows how the temperature of heating pot changes with time while the curve 67 shows the temperature change of rice with respect to time. This test was carried out under an ambient temperature of 11° C. As will be noted from these curves, the temperature of both the heating pot and rice rises relatively gradually over the initial period of 30 minutes. More particularly, during this period of 30 minutes the temperature of the heating pot had reached to 120° C. and that of the rice to about 84° C. from the initial temperature of 11° C. During this course of heating, rice particles in the boiler did not move or joggle at all and were uniformly heated.

Alphanization of rice began at about 60° C. upon elapse of about 20 minutes after initiation of heating and the rate of alphanization was increased with the rise of temperature. At about 30 minutes after the initiation of heating, evaporation of water in the heating pot was completed and thereafter the temperature of the pot has risen quickly to about 200° C. within relatively short time, at this point the thermal switch 31 was operated to open the pair of contacts 48 and 49. The temperature of rice was made to rise to 100° C. with the temperature rise of the heating pot. After the switch had opened the temperature of the rice was maintained at a substantially constant value of 100° C. for the interval of 17 minutes from 38 minutes to 55 minutes by the heat stored in the heating pot and the rice itself. As is clear from the curves, the rice was heated and aged by the electric heat and the stored heat over a period of 35 minutes and essentially the whole of the rice was converted to alpha state. It took about one hour to complete the whole rice boiling cycle during which the electric heater was energized for only 38 minutes.

Fig. 7 shows a test result of this invention using different type of automatic rice boiling apparatus according to this invention with about 1.8 litre of rice and same quantity of water charged in the rice boiler and 0.14 litre of water in the heating pot and using an electric heater of the rated capacity of 100 v., 840 w. This test was carried out under the ambient temperature of 16° C. Curves 66' and 67' show, respectively, the temperature of the heating pot and the temperature of the rice. In this case too, alphanizing period of 35 minutes by electric heat and stored heat was obtained during the whole rice boiling cycle of about one hour, and the energization time of the heater was nearly 40 minutes.

As will be clear from the above explanation, according to this invention, by selecting the quantity of water in the heating pot to a desired value, it is possible to control the periods of time required for heating and aging, that is the alphanizing period, to any predetermined value, in other words, it is possible to adjust the whole alphanizing period, thereby to alphanize substantially the whole of the rice, thus enabling to obtain the boiled rice of good taste and digestion. Furthermore, it is always possible to obtain excellent boiled rice without any skill, because the time interval required for the predetermined degree of alphanization can be automatically set by water quantity in the heating pot and the temperature switch responsive to the temperature of heating pot. Moreover, according to this invention, the rice in the rice boiler is indirectly heated by means of water contained in the heating pot, so that quick temperature rise of rice can be prevented and the rice particles do not joggle, thus paste like water is not formed in the rice boiler. Moreover, according to this invention, since any electric heat is not applied during the whole period necessary for alphanization of rice, any burned crust is not formed and most economical utilization of electricity can be realized.

In the above example, thermal switch of the type that can not be externally adjusted was used. But, some people like relatively hard or dry boiled rice while others like relatively soft or wet one. The wetness of a boiled rice can be adjusted to some extent by adjusting the quantity of water in the heating pot.

More particularly, by increasing the quantity of water in the heating pot, the time required for the complete evaporation thereof is lengthened so that various parts of the apparatus may be heated for longer period of time to store more heat. This stored heat is thereafter given to the boiled rice and serves to dry it. On the contrary, if water quantity in the heating pot is decreased, the thermal switch would operate at an earlier time so that less heat may be stored in the apparatus, resulting in a less dried or wet boiled rice. However, it is not desirable to change to a large extent the quantity of water in the heating pot, because this quantity is an important factor for attaining the desired heating and alphanizing period. By the reason above stated, it is advantageous to construct the apparatus such that the above object may be obtainable, without changing water quantity in the heating pot, by adjusting the time interval between completion of evaporation of the water contained in the heating pot and cut off of the electric heater.

Figure 8:
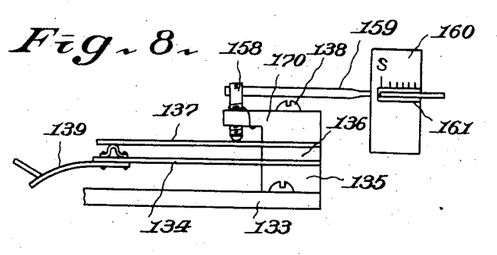
Fig. 8 shows a side view, partly broken away, of another form of thermal switch which can be used in this invention.

Fig. 8 shows a modification of this type constructed in accordance with this invention. In the drawing, numeral 134 indicates a temperature responsive bi-metallic element of the same general character as above described, the right end thereof being fixed on a block 135 mounted on a base plate 133. The left end of the bi-metallic element is connected to the switch mechanism through a figure 8 shaped spring plate 139, the detail of the switch mechanism being not shown in the drawing since it may be the same construction as above explained.

Blocks 135, 136 and 170, bi-metallic element 134 and a spring plate 137 superposed one another as shown in the drawing are clamped to the base plate 133 by means of a screw 138. In the thread of the projection of the block 170 is screwed a screw 158 which adjusts the biassing force of the spring plate 137 upon the bi-metallic element. One end of an adjusting lever 159 is attached to the head of the screw 158 and the other end extends through a hole 161 in a scale board 160 which is mounted on a jacket not shown. When the adjusting lever 159 is moved in a forward direction, that is away from the paper as viewed in Fig. 8, the biassing force applied upon the bi-metallic element 134 by the spring plate 137 will be increased and the bi-metallic element will break the contacts at a higher temperature of the heating pot, thus more dry boiled rice will be obtained. Conversely, when the adjusting lever 159 is moved in the opposite direction, biassing force of the spring plate will be decreased and the bi-metallic element will cause the contacts to separate at a lower temperature of the heating pot, thus moderately wet boiled rice can be obtained.

Figure 9:
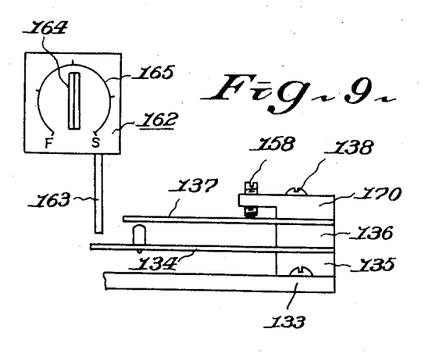
Fig. 9 is a side view, partly broken away, of a switch actuating mechanism of a combined temperature responsive device and a time delay switch which can be used in this invention.

Fig. 9 shows another modification of this invention in which a time switch 162 is combined with the bi-metallic element 134 of the same general construction as explained in Fig. 8 for adjusting the time interval between the completion of evaporation of water in the heating pot and deenergization of electric heater.

In this embodiment, the bi-metallic element 134 is so related to the timer 162 suitably mounted on the jacket, not shown, that it will push an actuating rod 163 of the timer when deflected upwardly. Although the details of construction of the timer have been omitted from the drawing, it is to be understood that the timer has a pair of contacts which are closed when a handle 164 is turned from a position marked "F" which means fast to a position marked "S" which means slow and are arranged to be opened after a predetermined time interval determined by the handle 164 and the scale 165 when the bi-metallic element pushes the actuating rod 163. Thus it is able to provide boiled rice of any desired degree of dryness.

Figure 10:
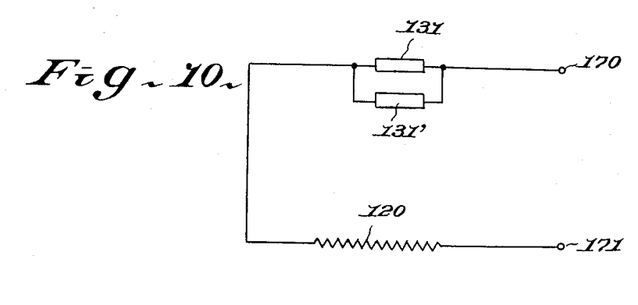
Fig. 10 is a connection diagram illustrating still another embodiment of this invention provided with means for maintaining the temperature of the boiled rice at a predetermined temperature.

Fig. 10 shows a still further modification of this invention which can maintain the boiled rice in warm state over a long period of time. As shown in Fig. 10 the electric heater 120 is connected across the terminals 170 and 171 through a pair of parallel connected thermal switches 131 and 131'. The thermal switch 131 is of generally the same type as the thermal switch 31 hereinbefore explained in connection with Figs. 3 and 4 and opens its contacts in response to a predetermined temperature rise of the heating pot. The thermal switch 131', however, is set to maintain a constant temperature, say about 70° C. necessary to maintain the boiled rice in warm state.

The operation of this embodiment is as follows:

A pair of terminals 170 and 171 are connected to a suitable source of electric supply, and the thermal switch 131 is closed. Since at this time the temperature of the rice boiling apparatus is still low, the contacts of the switch 131' are also closed and the electric heater 120 is energized through the contacts of both switches 131 and 131'. When the temperature of the heating pot exceeds 70° C., the thermal switch 131' will open its contacts. With the advance of the rice boiling cycle, the thermal switch 131 will open its contacts in response to a predetermined temperature rise of the heating pot which occurs after the water therein is completely evaporated.

It is to be remembered that the switch 131 is of the type that it can be reclosed only by manual operation. After the predetermined whole alphanization period by heat is completed, the temperature of the heating pot begins to decrease below 100° C. until finally the thermal switch 131' closes its contacts to reenergize the electric heater 120.

Thereafter the temperature of the boiled rice is maintained at about 70° C. by the well known intermittent action of the thermal switch 131'.

Figure 11:
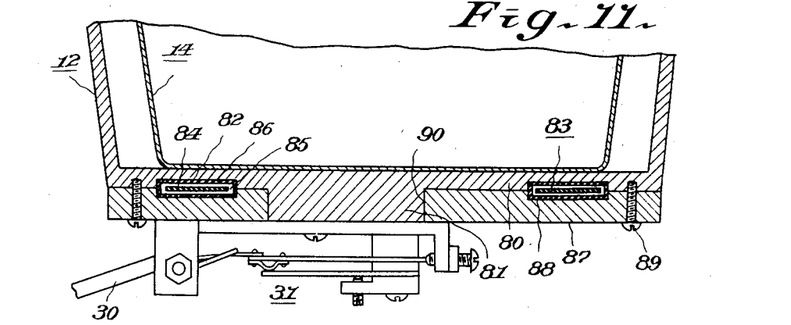
Fig. 11 is a view showing vertical section of a portion of another embodiment.

In a modification shown in Fig. 11 which shows a vertical section of the bottom portion of the rice boiling apparatus with the outer jacket removed, the bottom 80 of the heating pot 12 containing the rice boiler 14 is provided with a unitary projection 81. This projection not only serves as a post for mounting a thermal switch 31, but also as a heat conducting member to conduct heat from said bottom to the thermal switch 31.

On the outer surface of said bottom there is also provided an annular groove 82 in which is disposed an annular flat electric heater 83 comprising an annular insulating plate 84 such as mica, a resistance wire 85 helically wound on said insulating plate and an insulating cover 86 enclosing the resistance wire. A heat storing plate 87 having a conjugate annular groove 88 to receive the electric heater 83 is placed over the heater and fixed to the bottom 80 by means of screws 89.

The heat storing plate 87 is provided with an opening 90 through which the projection 81 extends downward. The heat storing plate is made of such a material having larger specific heat, that is larger heat storing ability than aluminum and the like from which the heating pot is usually made, for example, as iron, steel, copper, lead alloy and ceramic and the like, so as to store substantial amount of heat during the course of heating by electricity and maintain the temperature of the heating pot as well as the rice boiler at about 100° C. by the stored heat for a suitable period of time necessary to complete alphanization of rice after the electric heater has been deenergized. This plate is preferably made of iron, because it is most cheap.

Figure 12:
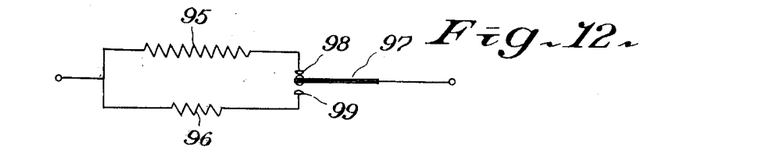
Fig. 12 is a connection diagram showing a modification of Fig. 10.

Instead of providing two thermal switches 130 and 131 as shown in Fig. 10, a normal electric heater 95 and an auxiliary electric heater 96 which are selectively energized by a double throw-type bi-metal 97 may be employed as shown in Fig. 12. During heating and boiling rice the bi-metal is in the position shown in Fig. 12 with its contact engaged with a stationary contact to energize the normal electric heater 95, but after a predetermined temperature rise has been attained it deflects in the downward direction to engage with the other contact 99 to energize the auxiliary heater 96 for maintaining the temperature of the boiled rice at a temperature, say at about 70 to 80° C., suitable to eat.

Although not shown in the drawings a suitable device may be provided for the bi-metal for locking it in the position engaging with lower contact. Also a suitable pilot lamp or lamps may be provided to indicate the energization or deenergization of electric heater. Furthermore, in the embodiment shown in Figs. 1 and 2 the outer jacket 11 is shown to completely enclose side and bottom walls of the heating pot with a heat insulating space or chamber 12 therebetween, but this is not always necessary and in some cases the jacket may be provided for enclosing only a portion of the heating pot, i.e. the bottom portion thereof which has the desired heat storage function.

While this invention has been shown and described in connection with some preferred embodiments thereof, this invention is not limited thereto and includes any modifications and alterations as fall within the true spirit and scope of this invention.

What I claim as new and desire to secure by Letters Patent of the United States is:

1. In apparatus for automatically boiling rice to effect a desired alphanization of said rice, an outer cup-like jacket, a heating pot positioned within said outer jacket, the upper edge of said heating pot being mounted on and supported by the upper edge of said jacket, the side walls and bottom of said heating pot being spaced from the side walls and bottom of said jacket to define a heat insulating chamber therebetween, the bottom of said heating pot being thicker than the side walls thereof and thereby having an appreciable thermal capacity, a heating element associated wtih the bottom of said heating pot for supplying heat thereto, a boiling pot for receiving a predetermined quantity of rice and liquid therein positioned within said heating pot, the bottom of said boiling pot engaging the bottom of said heating pot in heat transfer relation therewith and the side walls thereof being spaced to define a liquid receiving chamber therebetween, a lid, the inner periphery of which is adapted to be positioned on the upper portion of said heating pot for enclosing both the liquid receiving chamber and said boiling pot, said lid being spaced from the upper edges of said boiling pot to allow communication between the interior of said liquid receiving chamber and the interior of said boiling pot, whereby steam generated in said heating pot has access to the interior of said boiling pot, and a thermally responsive switch mounted in heat conductive relationship with respect to said heating pot for interrupting the energization of said heating element in response to a predetermined temperature rise of said heating pot when the evaporation of the liquid therein has been completed.

2. In apparatus for automatically boiling rice to effect a desired alphanization of said rice, an outer jacket, a heating pot positioned within said outer jacket and spaced therefrom to define a heat insulating chamber therebetween, said heating pot being mounted on and supported by the upper edge of said jacket and including an inwardly directed surface on its upper portion, a heating element associated with the bottom of said heating pot for supplying heat thereto, a boiling pot for receiving a predetermined quantity of liquid and rice therein positioned within said heating pot, the bottom of said boiling pot engaging the bottom of said heating pot in heat transfer relation therewith and the side walls thereof being spaced from the side walls of said heating pot to define a liquid receiving chamber therebetween, a lid adapted to be positioned on the inwardly directed surface of the upper portion of said heating pot for enclosing both the liquid receiving chamber and said boiling pot, said lid being spaced from the upper edges of said boiling pot to allow communication between said liquid receiving chamber and said boiling pot, and a thermally responsive switch mounted in heat conductive relationship with respect to said heating pot for interrupting the energization of said heating element in response to a predetermined temperature rise of said heating pot when the evaporation of the liquid therein has been completed.

3. In apparatus as set forth in claim 2, said thermally responsive switch including means for manually opening and closing a pair of contacts, a bi-metallic element responsive to a predetermined temperature rise for automatically separating said pair of contacts, and means for locking one of the contacts in an open position when it is automatically separated from the other contact by the action of said bi-metallic element.

References Cited in the file of this patent
UNITED STATES PATENTS

| | | |
|---|---|---|
| 1,047,418 | Kercher | Dec. 17, 1912 |
| 1,055,882 | Cubitt | Mar. 11, 1913 |
| 1,334,930 | Chadwick | Mar. 23, 1920 |
| 1,630,787 | Cullen | May 31, 1927 |
| 1,695,995 | Coulston | Dec. 18, 1928 |
| 1,969,878 | Dumas | Aug. 14, 1934 |
| 2,147,319 | Smith | Feb. 14, 1939 |
| 2,187,888 | Nachumsohn | Jan. 23, 1940 |
| 2,233,485 | Park | Mar. 4, 1941 |
| 2,312,555 | Jepson | Mar. 2, 1943 |
| 2,357,634 | Crites | Sept. 5, 1944 |
| 2,443,806 | Shafter | June 22, 1948 |
| 2,498,573 | Ozai-Durrani | Feb. 21, 1950 |
| 2,515,879 | Korn | July 18, 1950 |
| 2,518,566 | Osterheld | Aug. 15, 1950 |
| 2,539,999 | Huzenlaub et al. | Jan. 30, 1951 |
| 2,577,985 | Willman | Dec. 11, 1951 |
| 2,611,070 | Chandler | Sept. 16, 1952 |
| 2,641,681 | Willman | June 9, 1953 |
| 2,679,841 | Muckler | June 1, 1954 |
| 2,692,937 | Clark | Oct. 26, 1954 |
| 2,712,055 | Campbell | June 28, 1955 |
| 2,725,460 | Braski et al. | Nov. 29, 1955 |
| 2,741,682 | Schwaneke et al. | Apr. 10, 1956 |
| 2,761,375 | Jepson | Sept. 4, 1956 |
| 2,843,410 | Barnhart | July 15, 1958 |

OTHER REFERENCES

"Everybody's Cook Book," 1924, by Lord, published by Henry Holt and Co. (New York), pp. 198–199.